July 7, 1970     D. P. WAGNER     3,519,279
SEALING WASHER
Filed Nov. 1, 1968
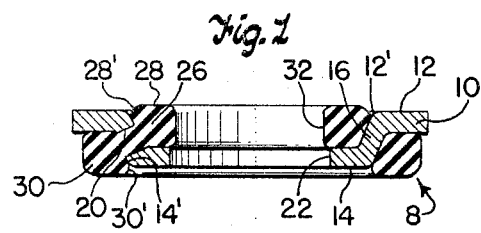
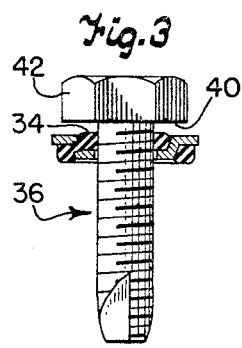
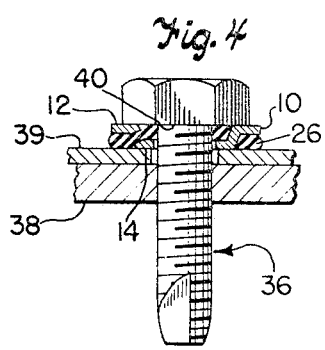
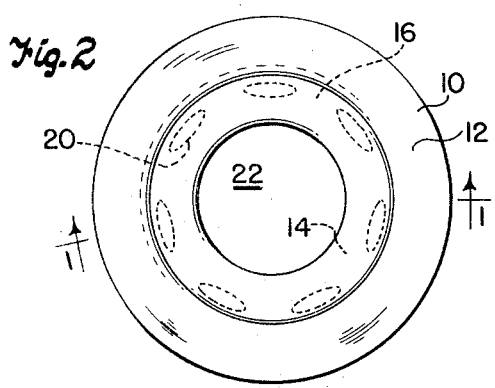
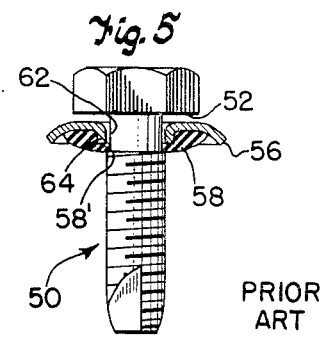
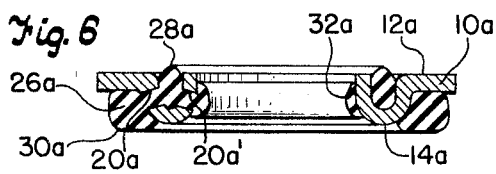
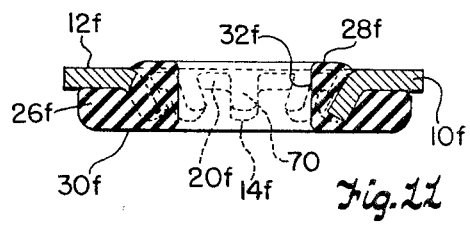
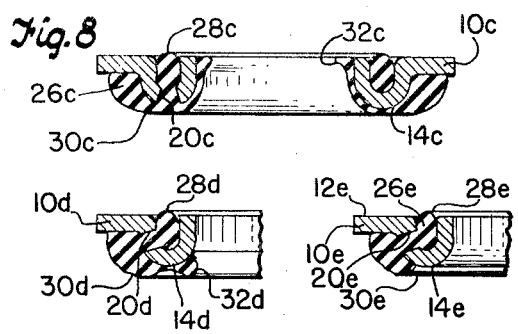
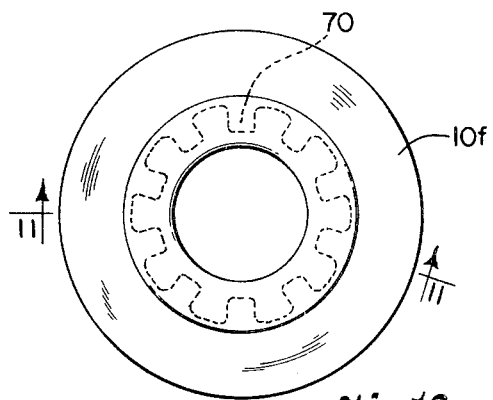
INVENTOR.
David P. Wagner
BY Barry L. Clark
Robert W. Beart
His Att'ys United States Patent Office 3,519,279
Patented July 7, 1970

3,519,279
SEALING WASHER
David P. Wagner, Elmhurst, Ill., assignor to Illinois Tool Works Inc., Chicago, Ill.
Filed Nov. 1, 1968, Ser. No. 772,606
Int. Cl. F16k *41/00;* F16j *9/06;* B65d *53/00*
U.S. Cl. 277—166          13 Claims

ABSTRACT OF THE DISCLOSURE

Sealing washer has its body formed so as to include upper and lower surfaces which are spaced apart by a distance greater than the thickness of the washer material. A rubber-like sealing member is molded against the washer so as to be in engagement with opposite sides thereof. A plurality of openings in the washer body connect the sealing material on one side of the washer with that on the other and permit the sealing member to be firmly anchored to the washer body without the use of adhesives.

BACKGROUND OF THE INVENTION

Field of the invention

The invention relates to washers and more particularly to sealing type washers.

Description of the prior art

It has been recognized that desirable properties in a sealing washer should include: the ability to be compressed to the limit of the strength of the material of the washer; and the ability to prevent the sealing material from being squeezed out when it is compressed. The sealing material should be soft and deformable such that it will fill and seal all of the voids into which it is pressed. Furthermore, a good sealing washer should also seal on both sides of the washer and/or around the internal diameter of the washer. Although it is known to the prior art to make sealing washers wherein the pressure transmitted through the washer by a fastener to a fastener receiving element can be directly transmitted through the metal portions of the washer, such devices have required the use of bonding agents such as adhesives to bond the rubber-like sealing material to the washer body. Obviously, the necessity for the rubber-like material to be bonded requires not only additional expense and materials but a considerable amount of labor as well. Furthermore, certain plastics or plated metals of which the washer body might be formed are extremely difficult to bond to.

SUMMARY

It is an object of this invention to provide a sealing washer which combines the rigidity of the washer body with the flexibility of a rubber-like sealing ring.

It is another object of this invention to provide a sealing washer which will provide a proper seal regardless of large variations in the amount of pressure applied to the washer by a fastener.

It is yet another object of this invention to provide a sealing washer wherein the sealing material is interlocked to the washer body without the use of bonding agents.

These objects are attained by the sealing washer of the present invention wherein a washer body, preferably metal, is formed so as to provide a pair of opposing contact surfaces which are positioned at a distance from each other in an axial direction which is greater than the thickness of the material of the washer body. A plurality of openings are formed in the washer body to permit rubber-like sealing material to be molded into contact with both sides of the washer body and held to the washer body by means of its passage through the openings and its contact with the walls thereof. The rubber-like sealing material is molded or otherwise formed so as to extend axially beyond the surfaces of the washer body. Thus, when the washer is compressed by a fastener being brought into engagement with a fastener receiving element, the sealing material will be compressed to provide a seal but cannot be overly compressed so as to lose its effectiveness as a seal. In several embodiments of the invention the sealing material is relieved in those areas immediately adjacent the contacting surfaces of the washer. The areas of relief between the sealing material and the washer permit the material of the sealing member to be taken up as it is compressed without permitting it to overlie the contacting surfaces of the washer body. Although it is generally desirable, especially where vibration is present, to prevent the sealing material from overlying the contacting surfaces of the washer body, it is also sometimes desirable, where there is no chance of vibration loosening the fastener, to prevent the metal washer surfaces from contacting either the head of the fastener or a member to be fastened. The latter situation often prevails in the construction field where metal to metal contact could cause scratching and corrosion.

In certain of the embodiments of the invention, a portion of the sealing material extends radially inwardly of the washer body and serves to resiliently contact a fastener member and hold the washer in a preassembled relationship thereto.

The foregoing and other objects, features and advantages, will be apparent from the following more particular description of several embodiments thereof, as illustrated in the accompanying drawings.

BRIEF DESCRIPTION OF THE DRAWINGS

FIG. 1 is a sectional side view of one form of sealing washer in accordance with my invention taken along the line 1—1 in FIG. 2;

FIG. 2 is a top plan view of the sealing washer shown in FIG. 1;

FIG. 3 is a sectional side view which shows the sealing washer of FIG. 1 in preassembled relationship with a fastener;

FIG. 4 is a sectional side view showing the sealing washer of FIG. 1 in sealing relationship between a fastener member and a fastener receiving element;

FIG. 5 is a sectional side view of a prior art sealing washer, wherein the sealing material is bonded to the washer body;

FIG. 6 is a sectional side view of a modification of the sealing washer shown in FIG. 1;

FIG. 7 is a sectional side view of a second modification of the sealing washer shown in FIG. 1;

FIG. 8 is a sectional side view of a third modification of the washer shown in FIG. 1;

FIG. 9 is a fragmentary sectional side view of a fourth modification of the sealing washer shown in FIG. 1;

FIG. 10 is a fragmentary sectional side view of a sealing washer which is similar to that shown in FIG. 9 except that the sealing material is in a modified position;

FIG. 11 is a sectional side view of an additional modification of the sealing washer shown in FIG. 1 taken along line 11—11 in FIG. 12; and FIG. 12 is a top plan view of the washer body shown in FIG. 11.

DESCRIPTION OF THE PREFERRED EMBODIMENTS

In FIG. 1, an embodiment of my invention is illustrated wherein a sealing washer indicated generally at 8 includes a circular metal washer body 10 which is formed such as by means of a pressing operation so as to attain a generally dish-like form wherein the upper contact surface 12 of the washer is spaced from the lower contact surface 14 by an amount greater than the thickness of the material of the washer body 10. The upper and lower contact surfaces 12, 14 are joined together by a sloping but generally vertical portion 16 which includes a plurality of openings 20. The openings 20 preferably comprise circular holes which are punched in the flat washer material prior to its being formed. The washer body also includes an inner aperture 22 through which a fastener is adapted to be passed. A sealing member 26 of rubber-like material is preferably molded to the washer body 10 and anchored thereto without the use of adhesives due to the fact that portions of the sealing material fill the openings 20 and extend on opposite sides of the washer body 10 to form a first or upper sealing ring portion 28 and a second or lower sealing ring portion 30. The upper sealing ring 28 may be made sufficiently wide so as to include a radially inwardly extending portion 32 which may serve as a third sealing portion for sealing the washer against a smooth shank portion 34 (FIG. 3) of a fastener 36. The inwardly extending sealing portion 32 may not only be used to provide an effective seal relative to the shank 34, but may also, or alternatively, be used to perform the function of maintaining the sealing washer in a preassembled relationship relative to the fastener 36 prior to the time it is assembled to a fastener receiving element 38 (FIG. 4) and a member to be fastened such as panel 39.

FIG. 4 shows the sealing washer of FIG. 1 in its compressed and sealed position wherein sealing rings 28, 30 are compressed by the movement of the underside 40 of the head 42 of fastener 36 into firm threaded engagement with fastener member receiving element 38 and a panel member 39 to be attached thereto. In order to achieve a firm solid vibration proof sealing between the fastener 36 and the panel 39, it is often desirable that the sealing material 26 be prevented from overlying the contact surfaces 12, 14 of the washer body 10. To accomplish this, the sealing member 26 is relieved at its upper and lower corners 28', 30' (FIG. 1) respectively so that it will not move sideways past corners 12', 14' of the washer body 10 when it is compressed.

FIG. 5 shows a prior art sealing washer-fastener member assembly wherein the sealing material must be bonded to the washer body. In this particular device, a fastener member indicated generally at 50 has a washer engaging surface 52 on its head and a washer body 56 preassembled to it. A layer of sealing material 58 bonded to the washer body 56 includes an inner ring of material 58' which seals the shank 62 of the fastener 50 to the washer body 56 as the vertical leg 64 of the body member 56 is forced down through the sealing material 58 by tightening pressure applied to the fastener 50. Aside from the requirement that the sealing material 58 must be bonded to the washer body 56, the prior art device also results in the compression of sealing material under the downwardly extending portions 64 of the washer body. Although this compressed sealing material is to a large extent cut by and squeezed out from under the washer vertical leg portion 64, there is a possibility that a small layer will remain and prevent a firm metal to metal contact between the various elements being fastened together.

FIG. 6 shows a modification of the invention wherein the washer body 10a is deformed so that its radially outermost portion has a flat upper surface 12a and its radially innermost portion is formed so as to have a generally U-shaped cross section having a lower surface 14a for contacting the fastener member receiving element. The washer body 10a includes two concentric rings of openings or holes 20a, 20a' which are spaced around the washer in a fashion similar to that shown in FIG.

2. The sealing member 26a includes an upper sealing ring portion 28a, a lower sealing ring portion 30a and an inner sealing ring 32a whose function is to hold and/or seal the washer relative to the shank of a fastener member. It should be noted that the generally vertical legs of the U-shaped configuration permit this modified sealing washer to withstand somewhat greater fastening loads than the dish-shaped washer body 10 of FIG. 1 whose angled wall portion 16 could permit the washer body to flatten out somewhat under excessive loading. The modification of the sealing washer shown in FIG. 6 has three completely separate sealing rings which are interconnected only by means of the sealing material 26a within the openings 20a, 20a'. It should be particularly noted that this design permits the sealing washer to be held in preassembled relationship to a fastener by means of the sealing portion 32a, but that the sealing function at the upper surface is not affected by variations in the diameter of the shank of a fastener member as would be the case with the embodiment of FIG. 1.

FIG. 7 shows a modified sealing washer wherein the washer body 10b is deformed so as to have a configuration of a pair of U's which share a common leg and one of which is upsidedown relative to the other. This configuration not only provides three vertical legs for transferring the load between the upper surface 12b and the lower surface 14b, but also permits the sealing rings 28b, 30b to be made of equal size and thus to be equally compressed during loading. Sealing rings 28b, 30b are connected to each other through a series of holes 20b similar to those shown in FIG. 1. A particular advantage of the double-U shape of the washer body is that the sealing material 26b is firmly engaged on its sides and thus can only be compressed axially. By varying the thickness of the sealing material in sealing rings 28b and 30b, the sealing washer can be made so that it will provide either a metal to metal contact with a fastener and fastener receiving element on surfaces 12b, 14b or a non-metal contact with the sealing rings 28b, 30b. If the latter type of contact is desired the rings 28b, 30b would be made sufficiently thick so that they could not be fully compressed into the U-shaped portions of the washer body 10b.

FIG. 8 illustrates another embodiment of my invention wherein the washer body 10c has a flat and U-shaped configuration identical to that in the FIG. 6 embodiment, but wherein only one row of openings 20c are provided. Since the openings 20c are in the lower surface 14c of the washer, the sealing member 26c will necessarily have a portion underlying the lower surfaces 14c of the washer body 10c which will either be severed or compressed during use as a fastening load is applied. In this respect, the sealing washer is somewhat similar to the prior art showing of FIG. 5. However, it should be noted that the embodiment of FIG. 8 includes an upper sealing portion 28c which will provide a sealing function regardless of the amount of sealing which takes place at sealing portion 32c.

FIG. 9 shows a modification of a sealing washer wherein the washer body 10d has a U-shaped configuration similar to the modification of FIGS. 6 and 8. The openings 20d are however arranged in the outer vertical legs of the U. This modification provides sealing rings 28d and 30d as well as an additional sealing portion 32d which may function to hold the washer in preassembled relationship to a fastener.

FIG. 10 shows a modification which is identical to FIG. 9 except for a variation in the shape of the sealing member 26e. Inasmuch as no portion of the sealing material is provided for holding the washer in preassembled relationship with a fastener, the lower portion 14e of the washer body 10e may readily contact a fastener receiving element without compressing any sealing material between the washer body and the fastener receiving element.

The modification of my sealing washer shown in FIGS.

11 and 12 incorporates a washer body 10f which may generally be described as a toothed lock washer which has had its teeth 70 deformed in a downward direction relative to the plane of the washer. The openings 20f between the teeth 70 perform a function similar to the openings 20 in the other modifications in that they anchor the sealing member 26f to the washer body 10f so as to form a lower sealing ring 30f, an upper sealing ring 28f, and an inner sealing member 32f.

While the washer body 10 has been shown in the various modifications as being made of metal such as steel, it is obvious that any suitable non-metallic material could also be used. Since my improved sealing washer does not require that the sealing material, whether it is rubber or some other material having similar properties, be bonded to the washer body, it has particular advantages for use with washer body materials which are not easily bonded to materials such as certain plastics and plated metals.

What is claimed is:

1. A sealing washer for use with a fastener member having an elongated shank and a head at one end of said shank, said washer having an aperture therein for receipt of said shank and comprising a first surface portion on one side of the washer engageable with the under side of said head and a second surface portion on the other side of the washer spaced from the first surface portion by an amount greater than the thickness of the washer material and engageable with a fastener member receiving element, said washer further having a plurality of spaced openings therein communicating between the opposite sides thereof, a rubber-like sealing member mounted in engagement with the walls of said plurality of openings and extending on opposite sides of said washer, said sealing member including first and second sealing portions which are resiliently compressed between said washer and said fastener member and between said washer and said fastener member receiving element when said washer is compressed by the engagement of the fastener member with the fastener member receiving element.

2. A sealing washer in accordance with claim 1 wherein said openings are holes positioned in said washer intermediate its inner and outer peripheries.

3. A sealing washer in accordance with claim 1 wherein a portion of said sealing member extends radially inwardly of said aperture and into resilient contact with the shank of said fastener member for retaining said washer and fastener in preassembled relationship prior to engaging said shank with said fastener member receiving element.

4. A sealing washer in accordance with claim 1 wherein said washer has a generally U-shaped cross sectional configuration between said first surface portion and said aperture, the bottom of said U-shaped configuration comprising said second surface portion.

5. A sealing washer in accordance with claim 4 wherein some of said openings are located in each of the legs of said U-shaped configuration, said first and second sealing portions extending above and below said first and second surface portions of said washer and being connected to each other and to the washer by that portion of the sealing member which passes through the openings in the outer leg of the U-shaped configuration, and an additional sealing portion extending into said aperture, said additional sealing portion being connected to said first and second sealing portions and to said washer solely by that portion of the sealing member which passes through the openings in the inner leg of the U-shaped configuration.

6. A sealing washer in accordance with claim 1 wherein said first and second sealing portions are held to the washer solely by the portion of the sealing member which engages the walls of the openings.

7. A sealing washer in accordance with claim 1 wherein said washer has a cross-sectional configuration corresponding to the shape of a pair of U's which have a common leg and one of which is upside-down, each of the first and second surface portions of the washer comprising the bottom of one of said pair of U's and the top of the non-common leg of the other.

8. A sealing washer in accordance with claim 1 wherein said openings intersect with the inner peripheral edges of said washer which define the aperture.

9. A sealing washer in accordance with claim 8 wherein said washer comprises a plurality of downwardly directed teeth on its inner periphery, the spaces between said teeth defining said openings.

10. A sealing washer in accordance with claim 4 wherein said openings are in the leg of said U-shaped configuration which adjoins said first surface portion.

11. A sealing washer in accordance with claim 4 wherein said openings are in the bottom of said U-shaped configuration.

12. A sealing washer in accordance with claim 1 wherein said washer has a generally dish-shaped configuration with said openings being located in the angled walls connecting the top and bottom thereof.

13. A sealing washer in accordance with claim 1 wherein at least one of said first and second sealing portions extends axially beyond the adjacent surface portion but is relieved below said surface portion at its closest point thereto, said relief permitting said at least one sealing portion to be compressed without overlying said surface portion.

References Cited

UNITED STATES PATENTS

| | | | |
|---|---|---|---|
| 2,795,444 | 6/1957 | Nenzell | 277—180 |
| 2,981,651 | 4/1961 | Arnold | 277—181 X |
| 2,995,782 | 8/1961 | Heller | 277—182 X |
| 3,170,701 | 2/1965 | Hoover | 277—180 |
| 3,286,577 | 11/1966 | Weidner | 277—166 X |

SAMUEL ROTHBERG, Primary Examiner

U.S. Cl. X.R.

85—1; 277—180